US012757833B2

(12) United States Patent
Somarowthu et al.

(10) Patent No.: US 12,757,833 B2
(45) Date of Patent: Oct. 13, 2026

(54) SYSTEM AND METHOD FOR REAL-TIME ADJUSTMENT/REMEDIATION OF CRIMPED CROP

(71) Applicant: Deere & Company, Moline, IL (US)

(72) Inventors: Mahesh Somarowthu, Pune (IN); Noel W. Anderson, Fargo, ND (US); Joshua J. Carson, Urbandale, IA (US); Vernon K. Gambleton, Ankeny, IA (US); Ajit K. Thankappan Pillai, West Des Moines, IA (US); Carolyn R. Herman, La Porte City, IA (US); David J. Myers, Cedar Falls, IA (US); Andrew M. Colosky, Urbandale, IA (US)

(73) Assignee: Deere & Company, Moline, IL (US)

( * ) Notice: Subject to any disclaimer, the term of this patent is extended or adjusted under 35 U.S.C. 154(b) by 469 days.

(21) Appl. No.: 18/359,378

(22) Filed: Jul. 26, 2023

(65) Prior Publication Data

US 2025/0031618 A1 Jan. 30, 2025

(51) Int. Cl.
*A01D 43/10* (2006.01)
*G06T 7/00* (2017.01)

(52) U.S. Cl.
CPC .......... *A01D 43/102* (2013.01); *G06T 7/0004* (2013.01); *G06T 2200/24* (2013.01); *G06T 2207/20081* (2013.01); *G06T 2207/20084* (2013.01); *G06T 2207/30188* (2013.01)

(58) Field of Classification Search
CPC ................ A01D 43/102; G06T 7/0004; G06T 2207/20081; G06T 2207/20084; G06T 2207/30188; G06T 2200/24
See application file for complete search history.

(56) References Cited

U.S. PATENT DOCUMENTS

| | | | |
|---|---|---|---|
| 4,850,183 | A | 7/1989 | Fox |
| 7,987,917 | B1 | 8/2011 | Kornecki |
| 8,176,991 | B1 | 5/2012 | Kornecki |
| 8,984,851 | B2 | 3/2015 | Pruitt et al. |
| 10,440,874 | B2 | 10/2019 | Butler |

(Continued)

FOREIGN PATENT DOCUMENTS

| | | | | |
|---|---|---|---|---|
| CN | 117548370 A * | 2/2024 | | ............. G01B 11/24 |
| EP | 3766332 A1 | 1/2021 | | |

OTHER PUBLICATIONS

Translation for CN117548370A (Year: 2026).*

*Primary Examiner* — Thomas Ingram
*Assistant Examiner* — Ashutosh Pande
(74) *Attorney, Agent, or Firm* — Tucker Ellis LLP; Michael G. Craig

(57) ABSTRACT

One or more techniques and/or systems are disclosed for automatically adjusting conditioning rollers of a crimping implement, such as those used to condition hay or other crimped crops, such as cover crops. Adjustments can be made on the fly to rollers, crimpers, or down pressure applicators used to condition the crop based on several factors such as the condition of the crop, the type of crop, and more. Sensors can be used to detect the crops and others' conditions before and after conditioning, and automatic adjustments can be made, such as the distance between conditioning rollers, and/or the pressure applied by the rollers, etc. to meet a desired crop condition for the crimped crop.

20 Claims, 10 Drawing Sheets

(56) References Cited

U.S. PATENT DOCUMENTS

| | | | | |
|---|---|---|---|---|
| 10,448,570 | B2 | 10/2019 | Graeve et al. | |
| 10,694,666 | B2 | 6/2020 | Baum et al. | |
| 11,089,728 | B2 | 8/2021 | Wire et al. | |
| 11,497,161 | B2 | 11/2022 | Murray | |
| 2013/0000495 | A1* | 1/2013 | Posselius | A01F 15/10 100/88 |
| 2018/0325029 | A1* | 11/2018 | Rotole | A01D 57/26 |
| 2018/0325031 | A1* | 11/2018 | Rotole | A01D 43/102 |
| 2019/0116733 | A1* | 4/2019 | Wire | A01D 43/085 |
| 2019/0228225 | A1* | 7/2019 | Guo | G06Q 50/02 |
| 2019/0257581 | A1* | 8/2019 | Wray | F26B 1/005 |
| 2020/0334859 | A1* | 10/2020 | Sneyders | G06T 7/80 |
| 2021/0015032 | A1* | 1/2021 | Murray | A01D 34/008 |
| 2021/0059113 | A1* | 3/2021 | Wire | A01D 43/085 |
| 2021/0150207 | A1* | 5/2021 | Guo | G06T 7/77 |
| 2021/0267121 | A1 | 9/2021 | Childs | |
| 2022/0046852 | A1 | 2/2022 | Lovett et al. | |
| 2022/0210974 | A1 | 7/2022 | Fay, II et al. | |
| 2022/0226871 | A1* | 7/2022 | Kraus | A01D 82/00 |
| 2023/0100004 | A1* | 3/2023 | Brauer | G06V 10/82 382/110 |
| 2023/0140138 | A1* | 5/2023 | Guo | G06N 3/094 382/110 |
| 2023/0292647 | A1* | 9/2023 | Bainbridge | G06T 7/0016 702/2 |
| 2024/0188496 | A1* | 6/2024 | Somarowthu | G06V 10/764 |

* cited by examiner

SYSTEM AND METHOD FOR REAL-TIME ADJUSTMENT/REMEDIATION OF CRIMPED CROP

BACKGROUND

In an agricultural setting, crop materials are often cut, conditioned, arranged into windrows, and/or otherwise processed. In some cases, the crop materials may be raked, chopped, and/or baled as well. In other cases, crops can be crimped to terminate in the field, such as for cover crops. Certain work vehicles are provided for these activities. Some harvesting work vehicles and attachable equipment, such as conditioning work vehicles, windrowing work vehicles, may include implements for crimping or cutting, conditioning, and/or arranging the crop material into a windrow as the work vehicle moves across a field. Typically, the configuration of these implements may be changed or adjusted based on the target project/crop/situation. For example, the position of the implements on the work vehicle may be selectively changed, and these implements can also be manually adjustable for desired results in most cases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for identifying the condition of crimped crops, such as those used as cover crops or those placed into windrows for later collection. Determining the condition of the crimp can help in adjusting the conditioning implement, such as a crimping roller or roller assembly of a windrower implement. For example, crops such as rye, alfalfa, hay or others are conditioned (e.g., crimped, and cut) for seasoning (e.g., drying) for later collection, or for termination in the field. In implementations described herein the rollers used to condition the crop (e.g., crimp the crop) can be automatically adjusted based on several factors such as the condition of the crop, the condition of the crimp, resulting crop condition, and more. That is, the distance between conditioning rollers can be adjusted, and/or the pressure applied by the rollers can be adjusted, to meet a desired crop condition for the implement.

In one implementation, a system for automatically adjusting a crop crimping implement can comprise a crop crimping implement that crimps a target crop. Further, the system can comprise a first image sensor that collects image data indicative of a condition of the target crop that is crimped by the crop crimping implement in real-time. A control module can receive the image data and generate crimp quality data indicative of a quality of a crimp applied to the target crop. The control module can comprise a computer processor, and memory that stores instructions. The instructions, when processed by the computer processor, are configured to generate the crimp quality data for the target crop by classifying the image data based at least upon shape, size, and color. Additionally, the instructions are configured to determine adjustment data indicative of an adjustment to the crop crimping implement based at least upon the crimp quality data and a predetermined crimp quality threshold. One or more actuators are used to adjust the crop crimping implement based at least upon the adjustment data.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
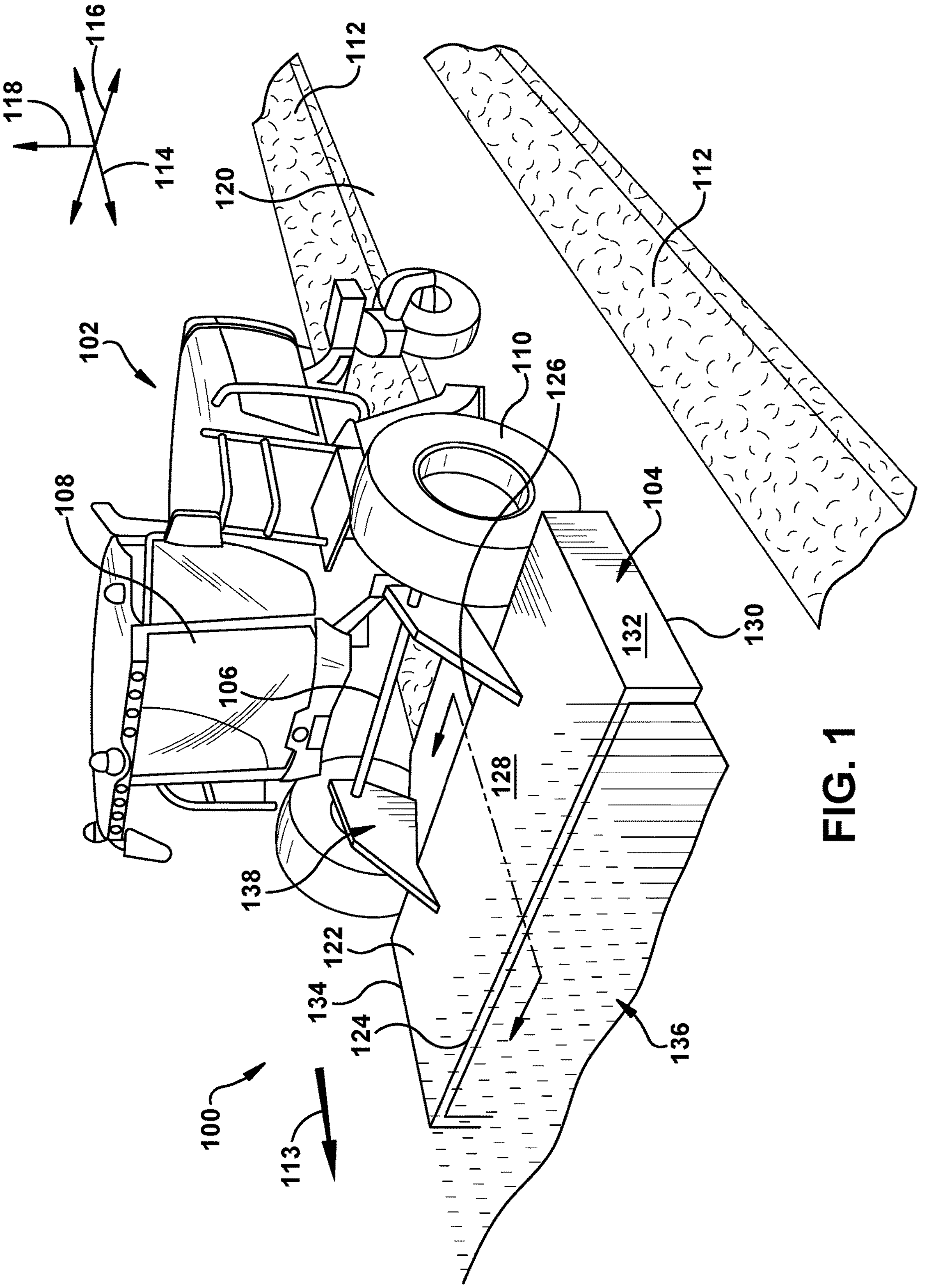
FIG. 1 is a component diagram illustrating one implementation of an example vehicle that may implement one or more systems and methods described herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As described herein, one or more systems and methods can be devised that provide for effectively adjusting a crimping implement, which may be part of a conditioning vehicle, or towed/pushed by a vehicle. The crimping implement can have conditioning rollers in a rotary header that cuts and conditions the crop or may be a crimping roller system that crimps a cover crop in place for termination. Further, in some implementation, the system may be devised to help identify escapes, which are portions of a crop that is not properly crimped for termination.

In one aspect, crimping applies pressure to plants, particularly to plant stems, to pinch or crimp the plant. In some examples, crimping is intended to facilitate the escape of moisture from the plant to accelerate crop dry down. In some examples, crimping is intended to impair the vascular system of the plant, leading to plant death. In some examples, crimping locations may be visually detected and assessed. As described herein, crimp quality data may be obtained from color, shape, or size analysis of crop images containing at least one crimp. Further, analysis may use any suitable method or methods including, without limitation, computer vision techniques, machine learning, or neural networks. As further described herein, crimp quality data may also comprise or be derived from other plant attributes including, without limitation, leaf characteristics, plant dimensions, crop biomass, crop maturity including reproductive stage, crop stress level, or crop moisture level. In some examples, crimp quality data is used to assess the effectiveness or acceptability of the crimping operation relative to a particular end through comparison to one or more crimp quality thresholds.

That is, for example, windrower machines are used to cut a target crop and create windows of the resulting cut crop. The windrowing machine typically has a header coupled to the front (e.g., alternately the rear) of the machine/implement. In this example, the header has a conditioner roller assembly, with conditioning rollers, which are used to crimp the cut crop to help it dry down faster. That is, for example, the cut crop is crimped by the roller assembly, where the crimping action helps break the outer shell of the crop stems. This breakage of the shell facilitates moisture removal (e.g., through evaporation), resulting in a faster dry down of the target crop. In this example, a smaller roll clearance results in greater crimping, which can result in an improved drying rate. However, a smaller roll clearance can also result in greater leaf loss, which is undesirable. Currently, an operator must pre-set the roll gap and roll tension in a known target position to achieve a known drying rate, with an allowable amount of leaf loss. In this example, the adjustment must be made even during harvesting by the operator based on changing crop size and changing crop conditions. In one aspect, this adjustment can facilitate crimping operation on a crimped crop (e.g., cut) in order to improve dry down time (e.g., decrease dry-down time), while mitigating leaf loss of the target crop, and crop losses that may result from undesirable force applied to the cut crop during conditioning.

As another example, crimping roller implements can be used to crimp a target crop to termination. That is, a cover crop, such as rye, may be planted between growing seasons to protect the soils from erosion invasive plants, etc., while providing nutrients after decomposition, following termination. Prior to plowing and planting, the cover crop is terminated in place by crimping the plants such that they die, and do not grow back or continue to grow. In another aspect, the adjustment can facilitate appropriate crimping conditions of a cover crop for termination, where too much crimping results in a cut crop that may regrow, or too little crimping may result in non-termination and continued growth of the crop.

In one aspect of the innovation described herein, a desired roll gap and/or roll tension can be estimated on-the-fly and applied to the roller assembly based on crop parameters, image data, and other data collected in real-time, such as header load measurements. As an example, in this aspect, an image capturing device can capture image data of the conditioned crop after it has been processed by the roller assembly. Additionally, in this example, size distribution data indicative of distribution of crop sizes in the harvested crop can be identified by the captured image data. A feature matching algorithm can be used to extract crop parameters such as size, length, perimeter/diameter of stem, crimping percentage, etc., for example; and a control system can generate control signals to automatically adjust roll gap and/or roll tension in the roller assembly based on the captured and processed data. Further, for example, a pressure sensing device coupled with the header motor power line (e.g., hydraulics line) can provide header load measurement of the incoming crop, which may also be used to adjust the roller assembly.

As an illustrative example, FIG. 1 illustrates a component diagram of an example work vehicle and associated equipment that may utilize the techniques and system described herein. As illustrated in FIG. 1, a harvesting work vehicle, such as a windrower 100, is illustrated as one example implementations of an embodiment of the present disclosure. In some implementations, the windrower 100 may be a self-propelled machine. However, the systems and methods described herein may be equally applicable to towed machines, or other configurations, as will be appreciated by those having skill in the art. Furthermore, although harvesting work vehicles that mow, condition and windrow crop materials are sometimes interchangeably referred to as mower-conditioners, swathers, windrowers, or the like, for the sake of simplicity, such machines will be referred to herein as "windrowers." Further, one or more portions of the methods and systems described herein may apply other harvesting work vehicles or to construction and forest harvester vehicles.

Machines that collect and condition crop material and form a windrow from the same material are discussed according to implementations of the present disclosure; however, it will be appreciated that the present teachings may apply to machines that form windrows without necessarily conditioning the crop material. The present teachings may also apply to machines that condition (crimp, crush, etc.) crop material without necessarily forming a windrow. Furthermore, the systems and methods of the present disclosure may apply to harvesting of various types of crop materials, such as grasses (e.g., rye), alfalfa, or otherwise. Accordingly, it will be appreciated that a wide variety of machines, systems, and methods may fall within the scope of the present disclosure.

In some implementations, the windrower 100 broadly comprises a self-propelled tractor 102 and a header 104 (e.g., header attachment). The header 104 may be attached to the front 138 of the tractor 102. The tractor 102 may include a chassis 106 and an operator compartment 108 supported atop the chassis 106. The operator compartment 108 may provide an enclosure for an operator and for mounting various user control devices (e.g., a steering wheel, accelerator and brake pedals, etc.), communication equipment and other instruments used in the operation of the windrower 100, including a user interface providing visual (or other) user control devices and feedback. The tractor 102 may also include one or more wheels 110 or other traction elements (e.g., tracks) for propelling the tractor 102 and the header 104 across a field or other terrain. The windrower 100 may form a windrow 112 as it moves along a travel direction indicated by the arrow 113.

The windrower 100 may define a coordinate system, such as a Cartesian coordinate system having a longitudinal axis 114, a lateral axis 116, and a vertical axis 118. The longitudinal axis 114 may be substantially parallel to the travel direction 113. The lateral axis 116 may be horizontal and normal to the longitudinal axis 114 to extend between opposing sides of the windrower 100. The vertical axis 118 may extend vertically and normal to the longitudinal axis 114, the lateral axis 116, and the ground 120.

The header 104 may generally include a frame 122, which is mounted to the chassis 106. The frame 122 may be mounted for movement relative to the chassis 106. For example, the frame 122 may move up and down, at least partly, along the vertical axis 118 relative to the chassis 106 and relative to crop material 136. In some implementations, the frame 122 may tilt and rotate about an axis that is parallel to the lateral axis 116. Also, the frame 122 may comprise one or more support elements for supporting implements (e.g., arrangement of implements, etc.).

The frame 122 may generally include a front end 124 and a rear end 126. The rear end 126 may be spaced apart along the longitudinal axis 114 and may be attached to the chassis 106 of the tractor 102. The frame 122 may also include a top structure 128 and a lower area 130, which are spaced apart along the vertical axis 118. Furthermore, the frame 122 may include a first lateral side 132 and a second lateral side 134, which are spaced apart along the lateral axis 116.

In the implementation illustrated in FIG. 1, and discussed below, the front end 124 is open to receive crop material 136 as the tractor 102 moves across the field. In some implementations, the windrower 100 cuts the crop material 136, then conditions the crop material, and then shapes, places and/or arranges the crop material 136 into the windrow 112 as the tractor 102 moves.

Figure 2:
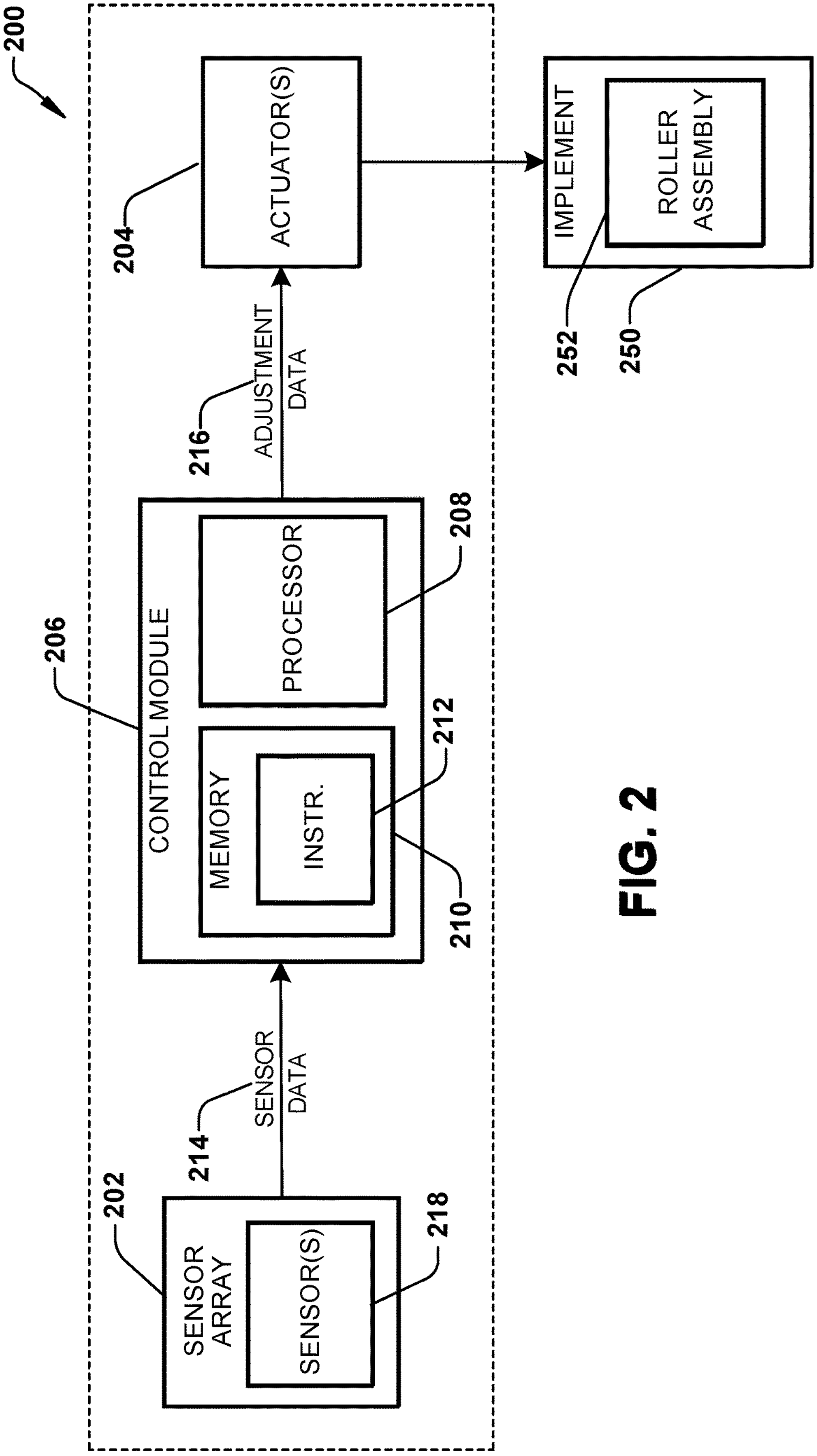
FIG. 2 is a schematic diagram illustrating one implementation of an example systems that can be used to perform roller gap adjustment, as described herein.
Figure 3B:
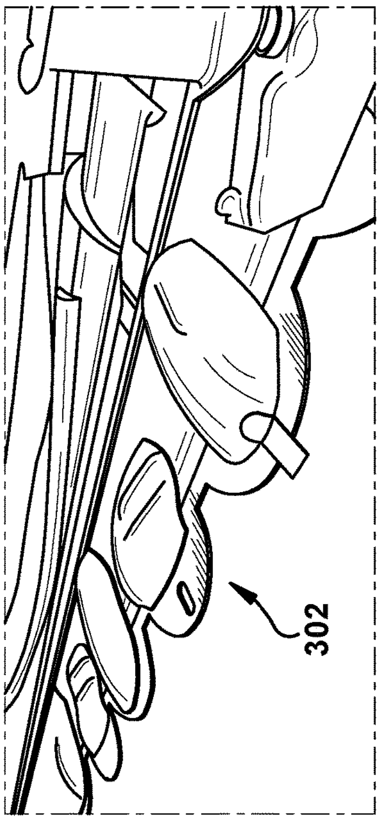
FIGS. 3A, 3B, 3C, and 3D are component diagram illustrating one example implementation of one or more portions of one or more systems as described herein.
Figure 3D:
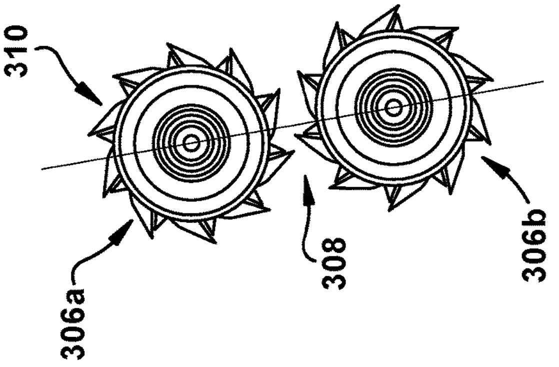
Figure 3A:
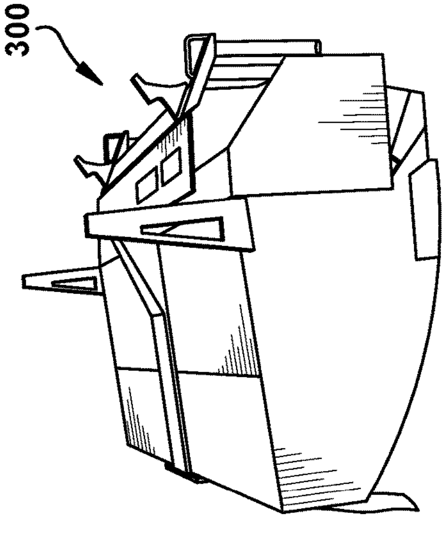
Figure 3C:
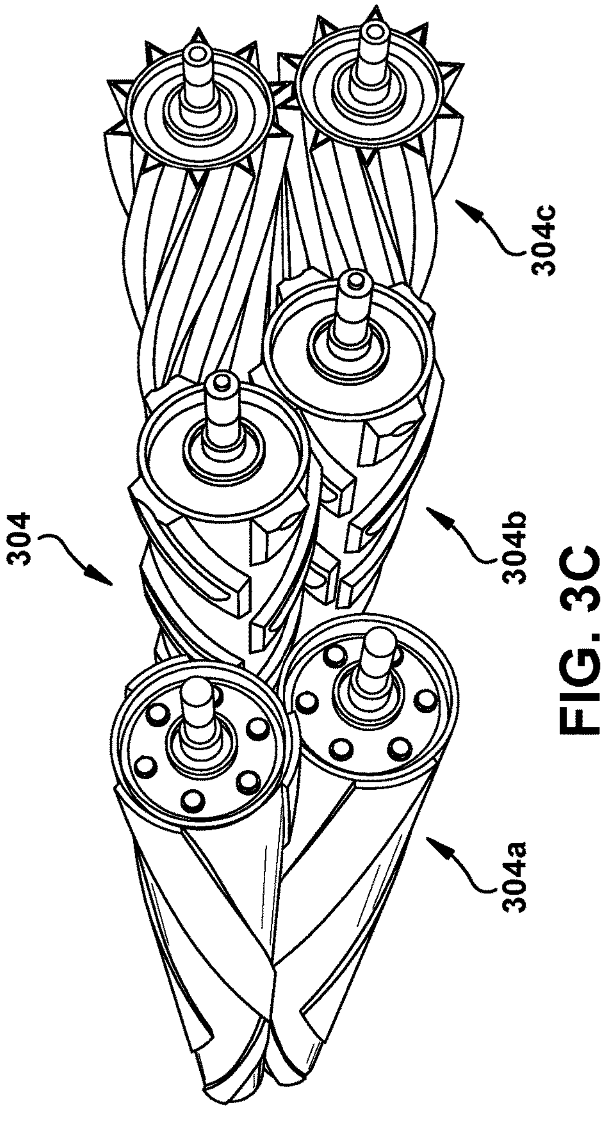

FIG. 2 is a schematic diagram illustrating one example implementation of a system 200 for improving conditioning of a cut crop during harvesting. In this implementation, the system 200 comprises a sensor array 202 that comprises one or more sensors 218, which collect sensor data 214 indicative of a condition of a target crop (e.g., 136 of FIG. 1) in real-time. That is, for example, the sensor array 202 can comprise an image sensor, such as a camera or the like, that generates image data to detect the condition of the target crop before it enters the windrower implement (e.g., header 104 of FIG. 1), while in the windrower implement, and/or when it exits the windrower implement, during operation of the windrower implement (e.g., during harvesting of the crop). In some examples, sensors 218 (e.g., 402, 406, 602, 1010) may be mounted on the work vehicle. In some examples, one or more of the sensors 218 (e.g., 402, 406, 602, 1010) may be mounted on a second work vehicle including without limitation a terrestrial vehicle, an aerial vehicle, or an orbiting satellite, or appropriate location for gathering target data.

In the example system 200, one or more actuators 204 can be used to adjust a distance between rollers in a roller assembly 252 of a windrower implement 250 on the fly based at least on received adjustment data 216. As an example, in FIGS. 3A, 3B, 3C, and 3D an example windrower implement can comprise a header 300 that is coupled to a vehicle, such as a tractor (e.g., 102 of FIG. 1). The header 300 comprises a set of cutters 302, such as rotating cutter blades, arranged in the front of the header 300 to cut down the target crop as it enters the header 300. Rearward of the cutters 302 is disposed one or more sets of rollers 304 that are configured to condition the target crop as it is drawn through the header 300 from the front to the rear. That is, for example, a first set of rollers 306*a, b* can be arranged with a gap 308 therebetween that is configured to allow the target crop to pass between the cutters, while crimping and/or pressure is applied to the crop passing through. Further, rollers 304 can comprise a variety of designs 304*a, b, c* that can include ridges, treads, or other features in a desired pattern that applies a desired amount or type of crimping, depending on the target crop.

In some implementations a first roller 306*a* may be configured to translate toward and away from a second roller 306*b* along an axis of translation 310, while roller 306*b* remains stationary. In other configurations, roller 306*b* may be translatable, while roller 306*a* remains stationary. In other configurations both rollers 306*a*, 306*b* may translate along the axis of translation 310. In this way, in this configuration, the gap 308 can be affectively decreased and increased. With continued reference to FIG. 2, in one example, the adjustment data 216 received by the actuator(s) 204 can result in the actuator(s) 204 increasing or decreasing the gap 308 between the rollers 306*a*, 306*b* during operation of the header 300. In this way, the amount and type of conditioning (e.g., crimping) of the target crop can be adjusted during operation (e.g., harvesting), on-the-fly.

Returning to FIG. 2, the example system 300 comprises a control module 206 that is configured to receive the sensor/image data 214 and transmits the adjustment data 216. That is, for example the control module 206 receives the image data 214 from the image sensor 218 and transmits the adjustment data 216 to the actuator(s). Further, the control module 206 comprises a computer processor 208, that is configured to process data and instructions, and provide resulting data based on the processed data and instructions. Additionally, the control module 206 comprises memory 210 (e.g., computer memory, such as a device or system that is used to store information for use in a computer or related computer hardware and digital electronic devices, including short and long-term memory, temporary and permanent memory, and the like). In this implementation, the memory 210 stores instructions 212 that are configured to, when processed by the computer processor 208, generate the adjustment data 216. The adjustment data 216 is generated by determining an amount of roller adjustment may be needed to result in a predetermined conditioning for the target crop, where the determined amount of roller adjustment is based at least upon the sensor data.

As an example, an operator may determine that a specified amount of conditioning and/or crimping is desired for a target crop, such as based on the type of crop, the crop conditions, the field conditions, type of equipment, and/or the weather conditions (present and future), and/or desired/anticipated dry-down time. For example, as described above, and increase in crimping can provide for a decrease in drying time for the target crop, which may be desirable when there is a smaller time window for harvesting (e.g., expected wet condition, expected rain, larger area for harvest, etc.). Further, different crops may have different conditioning requirements, such as those with different stem dimensions, foliage, lengths, and density or volume. Based on this information and more, the operator can select a desired conditioning that will achieve a target drying time while mitigating leaf loss from the crop to an acceptable level. In some implementations, the operator may input the desired drying time and can select the conditioning applied based on the predicted leaf loss (e.g., or vice versa).

Figure 4:
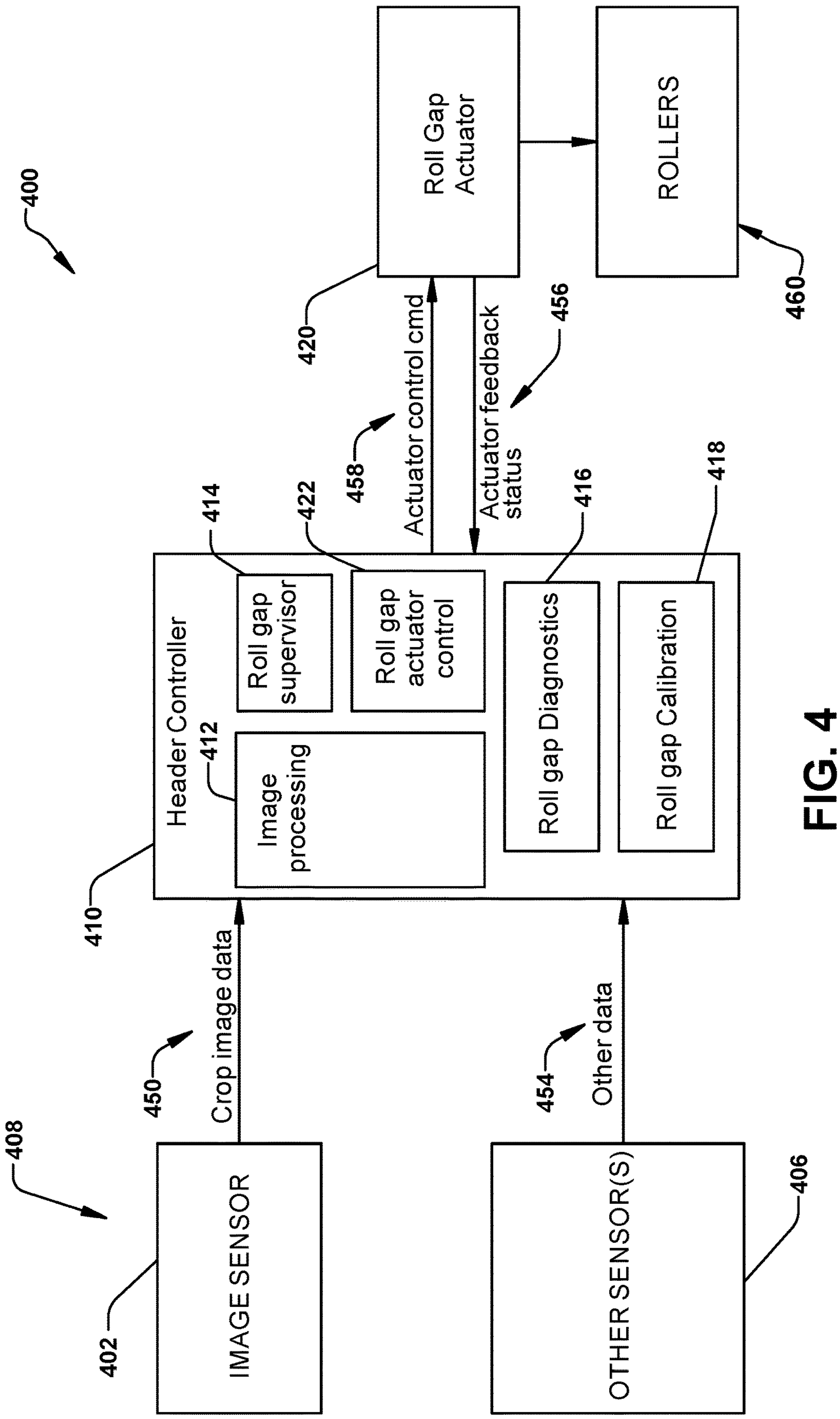
FIG. 4 is a schematic diagram illustrating one implementation of one or more portions of one or more systems as described herein.

FIG. 4 is a schematic diagram illustrating another example implementation of a system 400 that utilizes the innovative methods and systems described herein. In this example system 400, an imaging device 402, such as a camera (e.g., or radar, lidar, ultrasonic reader, etc.), can be mounted on or proximate the windrowing implement (e.g., header), such at the rear side (e.g., where the conditioned crop exits). As an example, the camera 402 can collect image data 450 of the target crop as it exits the header, and/or as it enters the header. Further, other sensors 406, such as a header load sensor, can detect other data 454 (e.g., header load), which can indicate an amount of the target crop is entering the header, such as a crop density or crop volume. In this example, the header load data 454 can be indicative of an amount of the target crop that is being processed by the header.

Additionally, the other sensor 406 can collect other data 454, such as by a sensor array and/or as input from other components of the harvester and header systems. For example, other data 454 can include the crop type (e.g., auto-detected or input by operator), engine speed of motor providing power to the header, header speed (e.g., over ground, and/or speed of rollers/cutters), vehicle speed (e.g., tractor, harvester), the roll gap between the one or more sets of rollers in the roller assembly of the header, the position of the header/vehicle, the power consumption of the header (e.g., power load) indicative of the load that is being placed on the header, such as by detecting a load (e.g., power load) that is being placed on the motor (e.g., electric, hydraulic, etc.) driving the header, and/or fuel consumption of the vehicle. This other crop data 454 can be used to provide indications of the crop condition and processing effectiveness of the conditioning rollers. As an example, the data can be collected by various sensors 406, etc., which can form parts of a sensor array 408, which can include the camera 402, the load sensor, and other sensors 406 and inputs for collecting the other data 454.

In the example system 400, a header controller 410 (e.g., a controller, control unit, etc., such as control module 206 of FIG. 2) may comprise a computer processor and memory (e.g., as shown in FIG. 2), which comprises instructions for performing various functions associated with the collected data 450, 454. In this implementation, the processor and instructions may use the collected crop image data 450 to perform image processing 412. Image processing can comprise a variety of technologies used to process images for a particular purpose, for example, which may include performing edge detection on image data 450 generated by the sensor array 408 to identify stems and leaves of the target crop (e.g., differentiate portions of the crop). Further, in some implementations, the image processing 412 may be used to identify boundaries of stems and perform feature matching to match with the predetermined conditioning for the target crop. For example, pre-programmed image data may be used to identify known or desired conditions for the target crop after conditioning, where the crop image data 450 collected in real-time can be compared (e.g., matched) with the pre-programmed image data to determine the actual condition of the conditioned crop with respect to a known or desired condition. Additionally, the image processing 412 can be used to perform a multi-layered image classification of images generated from the crop image data 450, based at least on deep convolutional neural network training of a classifier. That is, for example, the classifier can be used to determine the real-time characteristics of the conditioned crop from the crop image data 450. Without limitation, examples of conditioned or crimped crop characteristics can include number of crimps, average number of crimps per stem length, average stem length, percentage of severed stems, percentage of acceptable crimps, or percentage of insufficient crimps.

As illustrated in FIG. 4, the other crop data 454 (e.g., including header load data), and results of the image processing 412 can be combined to determine whether the roll gap needs to be calibrated (e.g., adjusted), for example, to attain a desired conditioning result for the harvested crop. A roll gap supervisor 414 (e.g., comprising instructions stored in memory processed by a processor) can be used to monitor the roll gap in the one or more sets of rollers in the roller assembly of the header. A roll gap diagnostics module 416 (e.g., comprising instructions stored in memory processed by a processor) can receive diagnostics (feedback status data 456) from a roller actuator, and the header itself (e.g., state data indicative of the current condition of the headers, rollers, etc.). A roll gap calibration module 418 (e.g., comprising instructions stored in memory processed by a processor) can be used to process the received data (e.g., from the sensor array) in real-time, in combination with diagnostics data for the header, actuator(s), and roller assembly to identify a potential adjustment for the roller gap (e.g., positive, negative, or zero adjustment). In some implementations, the roll gap calibration module 418 and/or the roll gap supervisor 414 can utilize the sensor data (e.g., processed image data 450 and other crop data 454) from a plurality of sensors in the sensor array 408 in a decision forest regression to identify the adjustment data. That is, a type of voting process can be used to identify or select the data or data sets that can be used to determine the desired adjustment for the roller gap. In some other implementations, processed image data 450 and other crop data 454 are used as inputs to a neural network or to a mathematical formula that outputs a value for actuator control command 458.

In some implementations, the controller 410 can transmit actuator control commands 458 (e.g., using a roll gap actuator control 422, such as comprising programming 212 resident on memory 210 processed by a processor 208) to a roll gap actuator 420, which result in the roll gap actuator adjusting (e.g., or not) the distance of the gap between respective one or more sets of rollers in the roller assembly. For example, which results in an adjustment of the conditioning of the target crop, on-the-fly, during operation.

As one example of process of operations, such as may occur using the system 400 of FIG. 4, image data of the target crop (e.g., before and/or after conditioning) is acquired from a camera. Further, other sensor data, such as load data, is collected, such as by a load sensor, including a crop density sensor. A plurality of other crop data can be collected, such as by a sensor array, including inputs and sensors, including, but not limited to, the crop type, engine speed (e.g., vehicle and/or header motor), header speed (e.g., over the ground), vehicle speed (e.g., over the ground), roll gap (e.g., for one or more sets of rollers), position of header and/or vehicle (e.g., GPS, geo-location), power consumption of the motor powering the header components, and fuel consumption of the vehicle.

The image data is fed into an image processing process. The image data can be enhanced to remove noise and increase contrast; and, in some implementations, the image data can be processed to identify the crimped crop, such as the extent and nature of the crimping conditioning of the crop. Further, the image can be processed to identify edges and morphologic details of the target crop, for example, which can help identify a crop condition after conditioning.

The color image enhanced image data can be processed further to provide for segmentation and boundary identification, which can help identify leaf shapes and sizes, and stem shapes and sizes. In some implementations, the identified crimp crop data (e.g., comprising other data) can be used to extract crop characteristics, such as seed, leaf, and stem shapes and sizes (e.g., width and height).

Additionally, as one example, edge and morphology data can be processed in a multiclass decision forest, which provides for machine learning classification. A multi-class decision forest can comprise an algorithm that works by building multiple decision trees, and then voting occurs of the most popular output class. For example, voting is a form of aggregation, in which each tree in the classification decision forest outputs data (e.g., a non-normalized frequency histogram of labels), and then sums the data and normalizes the result to get the probabilities for each data label, for example, a favored result. The segmentation/boundary data is input to a feature matching model, which uses comparative analysis between the identified features of the segmentation/boundary data and known, pre-determined features, such as of a desired or known crop condition. The segmentation/boundary data is input to a deep convolutional neural network (DCNN) classifier, which is used to classify portions of the image data into known image classifications, such as identifying portions of the conditioned crop (e.g., stem crimping, leaf and/or seed density, etc.).

The results of the multi-class decision forest, along with the results of the feature matching, DCNN, and in some implementations the extracted crop characteristics, can be input to a decision forest regression. The results of the decision forest regression can be used to identify a potential adjustment to the rollers or other actuators. The decision forest regression model consists of an ensemble of decision trees (e.g., identified by the various classifiers), each of which outputs a Gaussian distribution as a prediction. In this example, an aggregation is performed over the ensemble of trees to find the Gaussian distribution that is closest to the combined distribution for all trees in the model. In this example, the result can be used to determine if and what needs to be adjusted in the roller assembly to obtain a desired conditioning of the target crop.

In this implementation, a roll gap and/or roll tension adjustment command is sent to roller actuators, described above. That is, based on the determination of the decision forest regression, an adjustment to the distance between a pair of rollers (e.g., or sets of rollers) can be adjusted to provide for an improved outcome to the crimping (e.g., more crimping, less crimping, same amount), such as can be presented on a user interface (UI) described further below; and an adjust to an amount of tension or pressure provided by the rollers can be adjusted (e.g., more pressure, less pressure, same pressure). Further, the decision forest regression outcome may provide for an adjustment of the roller speed differential. That is, for example, each roller in a pair (e.g., or set) of rollers may be rotating at a different speed (e.g., or the same speed of rotation), which can provide for variances in the conditioning of the target crop. In this example, the differential of the roller speed in the set of rollers can be adjusted to improve the conditioning to a desired result. In some implementations, the speed of the header (e.g., ground speed, motor speed, etc.) can also be adjusted based on the results of the decision forest regression, in order to achieve a desired conditioning result. In some implementations, crop presence module can identify whether a target crop is present in real-time. That is, for example, the data collected, and processing performed on the data can be used to identify whether a target crop is present, thereby facilitating in determination of adjustment (e.g., or not).

Figure 5:
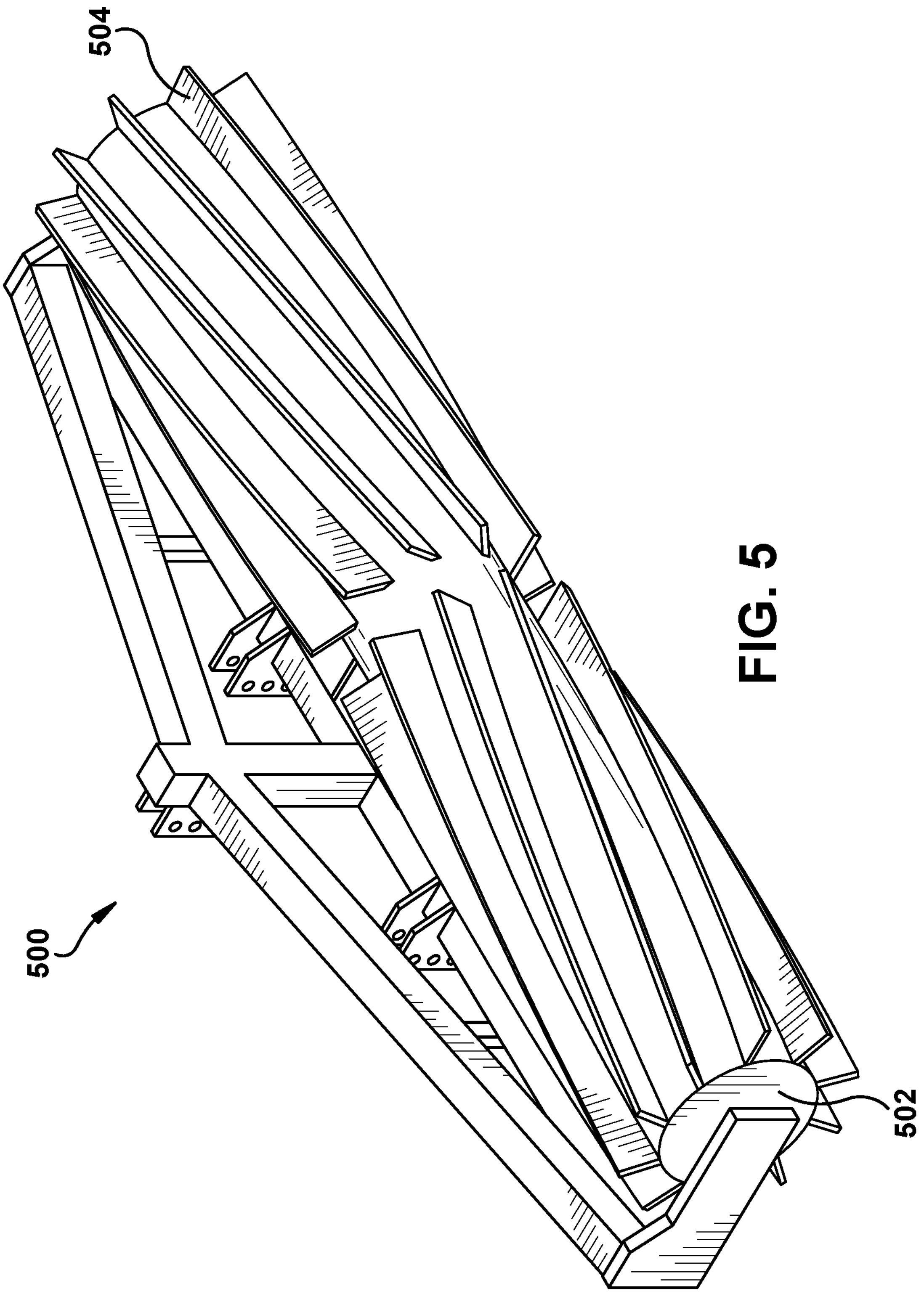
FIG. 5 is a component diagram illustrating one implementation of an example crimping implement that may implement one or more systems and methods described herein.

FIG. 5 is a component diagram illustrating at least a portion of an example agricultural implement 500. In this example, the implement 500 is a crop crimper implement that can be towed behind or pushed in front of a motorized vehicle, such as a tractor. In other implementations, the crimper can be disposed as a self-propelled vehicle. In this example, the crimper 500 comprises a crimper roller 502, that comprises sets of crimper elements 504 that are configured to crimp a target crop in the field. In some implementations, a vehicle can operate multiple rollers in a line. These types of crimper implements are typically used to terminate cover crops, which may be grown for ground cover in between desired crop growing seasons.

In one aspect, operation of a crimping implement can be adjusted based at least on information collected during a crop crimping operation. For example, one purpose for crimping crops in the field is for cover crop termination. That is, cover crops are typically grown between grain crop seasons to provide ground cover (e.g., to mitigate soil loss, maintain nutrients, mitigate growth of weeds, etc.), and are terminated prior to planting grain crops. Instead of using herbicides or other means, the cover crop can be terminated by applying an appropriate amount of crimping to the plant. In this way, the plant is terminated, and will not continue to grow. Further, if the plant is not crimped appropriately it may continue to grow; and if it is over crimped (e.g., cut) it may regrow. As such, it is desired to apply the appropriate amount of crimping to the cover crop to terminate the plant.

Plants that are not crimped correctly for termination are called escapes, as they will escape termination. In this aspect, escapes can be identified during the crimping process, such as by using image sensors, and their location can be identified, such as by using geolocation sensors. In some implementations, the crimping implement can be adjusted on the fly to mitigate the number of escapes. In some implementations, the number and location of escapes can be identified during the crimping process, and a remediation plan can be developed based on the information collected. In this way, escapes can be mitigated during the crimping, and/or can be later terminated based on a developed remediation plan.

Figure 6:
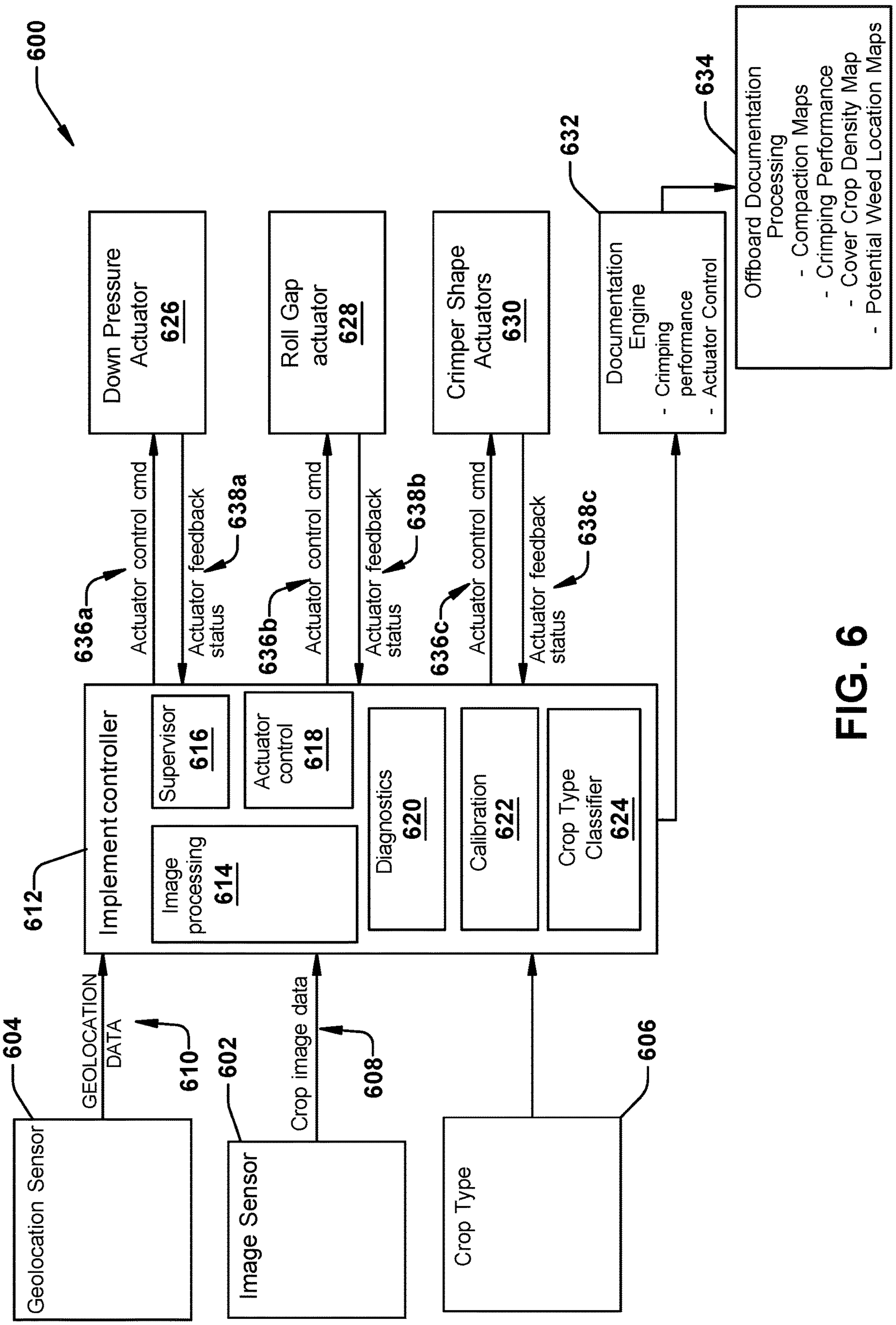
FIG. 6 is a flow diagram illustrating one example implementation of a method for performing a crimping implement adjustment, as described herein.

FIG. 6 is a schematic diagram illustrating one example implementation of a system 600 for adjusting a crimping implement. In this example system 600, an imaging device 602, such as a camera, can be mounted on or proximate the crimping implement (e.g., header), such at the rear side. As an example, the camera 602 can collect image data 608 of the target crop as it exits the implement, and/or as it enters the implement. Further, a geo-location sensor 604 can detect a geo-location data 610 (e.g., location coordinates) of the crimping implement (e.g., or tractor, etc.), which can indicate the location of the target crop as it is being harvested during the harvesting operation. As an example, the geo-location data 610 can be associated with the image data 608 to identify the location of a particular image collected during operation.

Additionally, crop type data 606 can be collected/entered into the system 600, such as by a sensor array and/or as input from a user interface. For example, crop type data 606 can be auto-detected by one or more sensors, and a crop type classifier 624 may be used to determine the type of crop for the operation. As an example, a classifier may use the sensor data 606 and compare it with pre-determined data to identify a crop type. Alternately, the crop type data 606 may be input by the operator. Crop-type data 606 can include the type of crop targeted for crimping, which may include cover crops. In this way, for example, the type of crop can be used to determine crimping quality, such that each crop may have a different amount, level, or type of crimping needed to terminate.

In the example system 600, an implement controller 612 (e.g., a controller, control unit, etc., such as control module 206 of FIG. 2) may comprise a computer processor and memory (e.g., as shown in FIG. 2), which comprises instructions for performing various functions associated with the collected data. In this implementation, the processor and instructions may use the collected crop image data 608 to perform image processing 614. Image processing can comprise a variety of technologies used to process images for a particular purpose, for example, which may include performing edge detection on image data 608 generated by the sensor array 602 to identify stems and leaves of the target crop, and crimped stems etc. (e.g., differentiate portions of the crop).

Further, in some implementations, the image processing 614 may be used to identify boundaries of stems and perform feature matching to match with the predetermined crimp conditioning for the target crop. For example, pre-programmed image data may be used to identify known or desired crimp conditions for the target crop after conditioning, as described above for crimping attributes, where the crop image data 608 collected in real-time can be compared (e.g., matched) with the pre-programmed image data to determine the actual condition of the conditioned crop with respect to a known or desired condition (e.g., is it crimped within a target threshold). Additionally, the image processing 614 can be used to perform a multi-layered image classification of images generated from the crop image data 608, based at least on deep convolutional neural network training of a classifier. That is, for example, the classifier can be used to determine the real-time characteristics of the conditioned crop from the crop image data 608.

As illustrated in FIG. 6, the other data (geolocation 610, crop type 607), along with the results of the image processing 614 can be combined to determine whether one or more components of the implement may need to be calibrated (e.g., adjusted), for example, to attain a desired conditioning result for the harvested crop. For example, an implement supervisor 616 (e.g., comprising instructions stored in memory processed by a processor) can be used to monitor the roll gap, down pressure, crimper shaper, and/or other features of the implement, respectively controlled by actuators 626, 628, 630. In this example, a diagnostics module 620 (e.g., comprising instructions stored in memory processed by a processor) can receive diagnostics (feedback actuator status data 638) from the roller actuator 628, down pressure actuator 626, and/or the crimper shaper actuator 630, and the implement itself (e.g., state data indicative of the current condition of the headers, rollers, etc.). A calibration module 622 (e.g., comprising instructions stored in memory processed by a processor) can be used to process the received data (e.g., from the sensor array) in real-time, in combination with diagnostics data for the implement, actuator(s), and assembly to identify a potential adjustment for the roller gap (e.g., positive, negative, or zero adjustment), down pressure, and/or the crimper shape.

In some implementations, the calibration module 418 and/or the supervisor 616 can utilize the sensor data (e.g., processed image data 608, crop type 606) from a plurality of sensors in the sensor array in a decision forest regression to identify the adjustment data. That is, a type of voting process can be used to identify or select the data or data sets that can be used to determine the desired adjustment for the various actuators 626, 628, 630, to obtain a desired result for the crimped crop.

In some implementations, the controller 612 can transmit actuator control commands 636*a* (e.g., using an actuator control 422, such as comprising programming 212 resident on memory 210 processed by a processor 208) to the respective actuators. For example, down pressure adjustment data/command 636*a* can be sent to the down pressure actuator 626 to adjust (e.g., up or down) the amount of down pressure applied by the implement to obtain a desired amount of crimping (e.g., to obtain crop termination). Roll gap adjustment data/command 636*b* can be sent to the roll gap actuator 628, which results in the roll gap actuator adjusting (e.g., or not) the distance of the gap between respective one or more sets of rollers in the roller assembly, to product a desired crimp. As another example, crimper shape adjustment data/command 636*c* can be sent to the crimper actuator 630, which results in a shape actuator 630 adjusting the shape of the crimper (e.g., creating a larger or smaller crimp edge) in the implement, to product a desired crimp. For example, adjusting the crimper actuators can result in an adjustment of the conditioning of the target crop, on-the-fly, during operation, to obtain a desired crimp result (e.g., crop termination).

In some implementations, a documentation engine 632 can be used to document (e.g., collect, store, and/or process) data regarding the crimping effectiveness (e.g., within target threshold) and/or the actuator control (e.g., adjustments) during operation. The information identified by the documentation engine 632 can be used for additional operations 634. For example, the data can be processed away from or after the operations to provide, amongst other things, compaction maps (e.g., maps identifying types and location of soil compaction), crimping performance (e.g., within threshold for crop termination), cover crop density map (e.g., providing the location and thickness of the targeted cover crop), and/or a potential weed location map. This additional information, for example, may be used to develop remediation plans for later operations to improve crimping and crop termination, and adjustments to current and future operations.

FIGS. 7A, 7B, 7C, and 7D are component diagrams illustrating alternate crimping implements for cover crop termination. As an example, a crimping implement, such as 500 shown in FIG. 5, comprises crimper elements 504 that are configured to crimp a target crop in the field. That is, for example, blades or paddles on the roller 502 can impact the target crop during an operation and crimp the stem. The target of the operation is to crimp the stem to terminate the plant, and not cut it off (e.g., which may result in regrowth) or lightly crimp it such that it continues to grow. The size and shape of the blades 504 are typically configured to provide for termination, but field conditions, crop density, and/or crop type may change in the field, and adjustments may be helpful to reach the target crimp. In this implementation, in FIGS. 7A and 7B, an implement blade 702 can comprise an extension blade 704, that can be operably adjusted to provide different crimping types. That is, for example, the extension blade 704 can be adjusted out (extended, FIG. 7A) or in (retracted, FIG. 7B), or somewhere in between, to provide a different crimping surface. For example, when the extension blade 704 is in an extended position (FIG. 7A) the blade 702 can provide for more crimping (e.g., greater pressure) on the target crop. Further, when the extension blade 704 is in a retracted position (FIG. 7B) the blade 702 can provide for less crimping (e.g., less pressure) on the target crop.

Figure 7C:
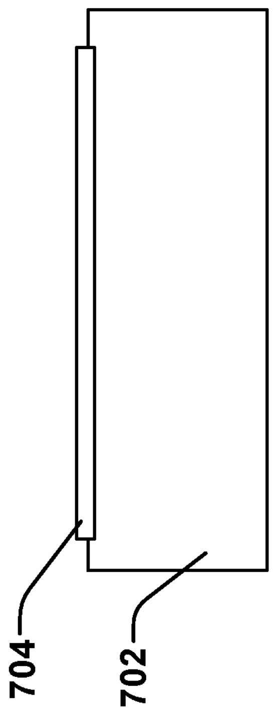
FIGS. 7A-D are a component diagrams illustrating an alternate implementation of example crimping implements that may implement one or more systems and methods described herein.
Figure 7D:
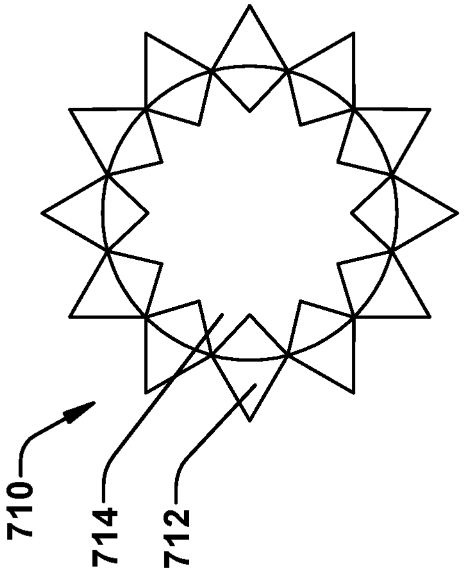
Figure 7A:
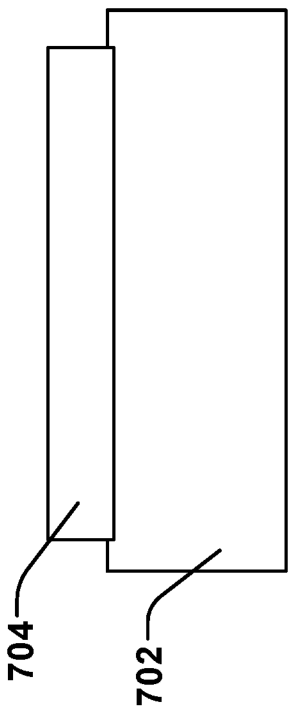
Figure 7B:
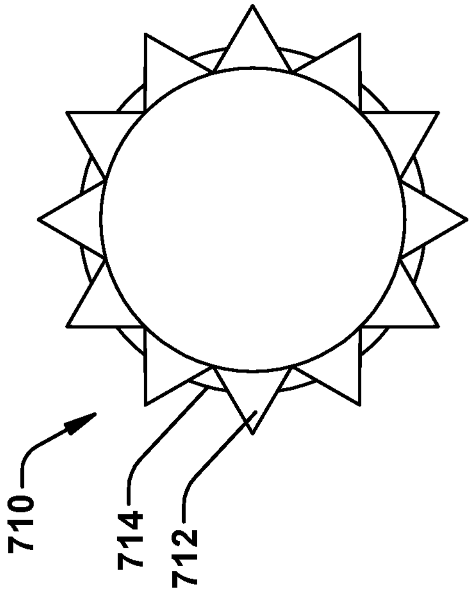

In an alternate implementation, in FIGS. 7C and 7D, the shape (e.g., amount of crimping surfaces) can be adjusted. In this implementation, a crimping roller 710 comprises a plurality of outer crimping surfaces 712 (e.g., blades) and inner crimping surfaces 714. In this example, the outer crimping surfaces 712 can provide a first level of crimping (e.g., lower), and the roller 710 can be adjusted to extend the inner crimping surfaces 714 to provide a second level of crimping. For example, in FIG. 7D merely the outer crimping surfaces 712 are exposed. In FIG. 7C the inner crimping surfaces 714 have been extended to provide additional crimping surfaces, thereby providing an increase in crimping.

Figure 8A:
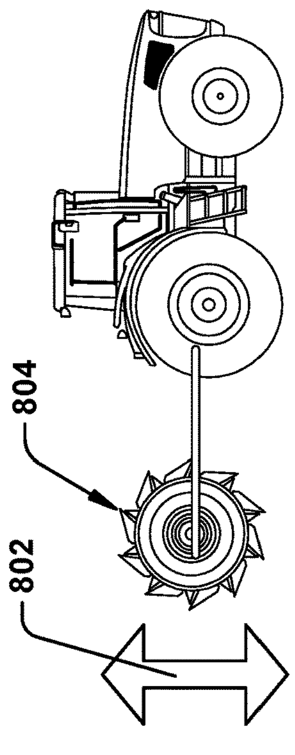
FIGS. 8A and 8B are a component diagrams illustrating an alternate implementation of example crimping systems that may implement one or more systems and methods described herein.
Figure 8B:
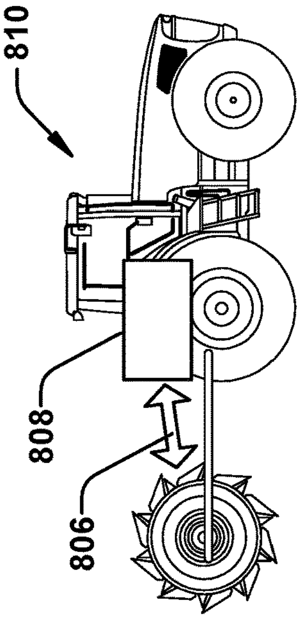

FIGS. 8A and 8B are examples of an alternate way of providing an adjustment of the crimping. In this implementation, an amount of downward pressure 802 on the crimping implement 804 can be adjusted by adjusting a distribution 806 of weight 808 between the implement 804 and a vehicle 810 pushing or pulling the implement 804. For example, a down pressure actuator (e.g., 626) can be used to adjust the weight 808 closer to or farther away from the implement 804. For example, a liquid (e.g., water or antifreeze) can be transferred to the implement to increase the weight and downforce of the implement. In this example, when the weight 808 is translated closer to the implement 804 a greater amount of down force may be applied to the crimping implement 804, which in turn provides for an increased amount of crimping applied to the target crop. Further, when the weight 808 is translated further from the implement 804 a lesser amount of down force may be applied to the crimping implement 804, which in turn provides for a decreased amount of crimping applied to the target crop. In this way, for example, the weight distribution 808 can be adjusted accordingly to adjust an amount of down force 802 applied, and an amount of crimping applied to the target crop.

Figure 9A:
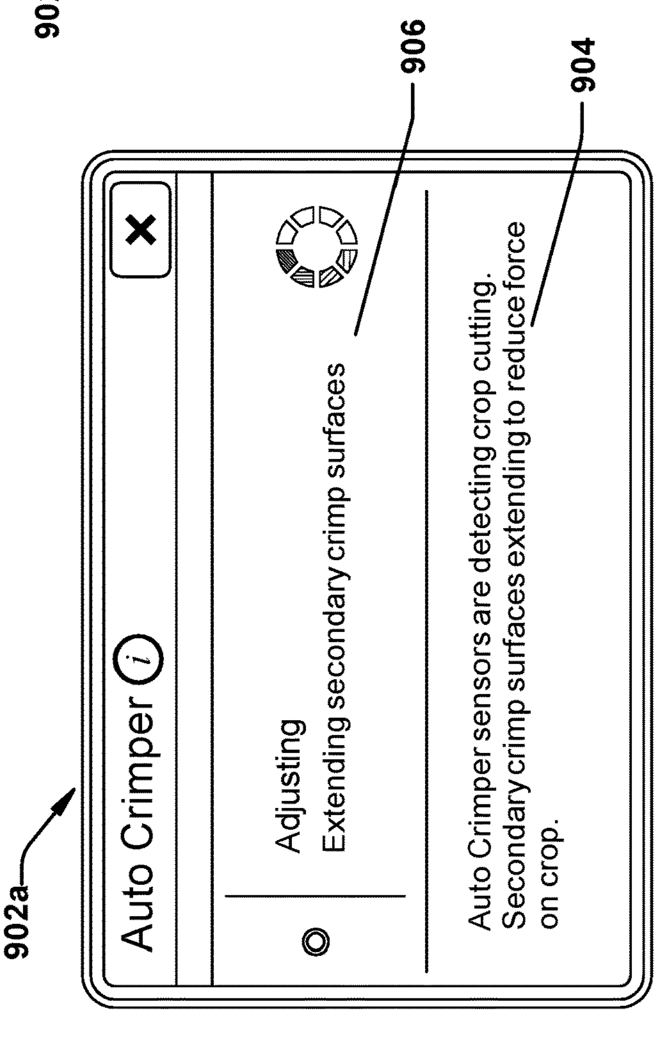
FIGS. 9A and 9B are a component diagrams illustrating alternate implementation of example user interfaces that may implement one or more systems and methods described herein.
Figure 9B:
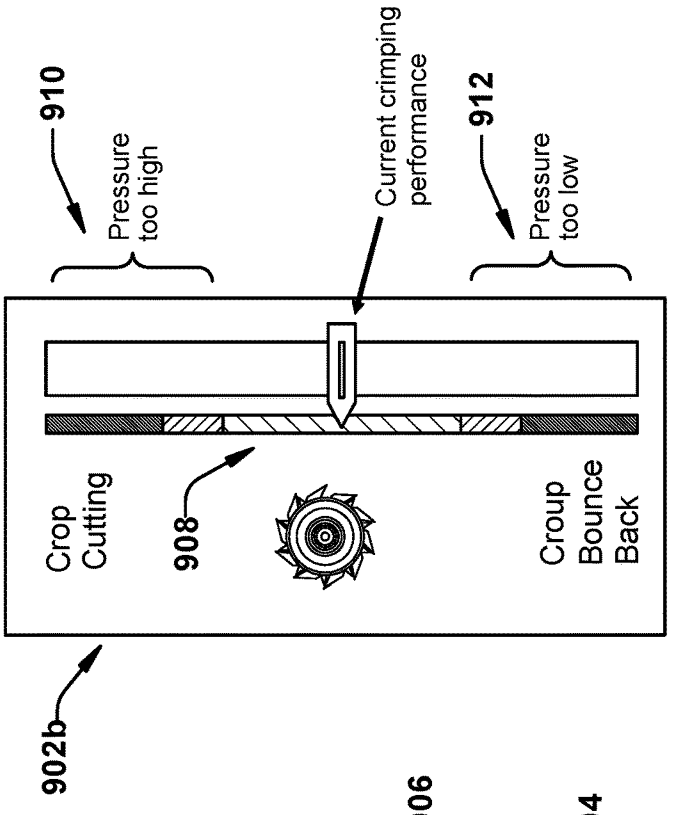

FIGS. 9A and 9B illustrate an example user interface 902 (UI) that may be implemented for an operator of the crimping implement (e.g., such as in the operator compartment 108 of FIG. 1. In FIG. 9A, the user interface 902*a* identifies when the system detects a needed adjustment 904 and relays the information to the operator. Further, the UI 902*a* identifies when the shape of the implement is being adjusted, and what type of adjustment is being made. As an example, in this implementation, the system is sending commands to the actuators to extend the secondary crimping surfaces (e.g., 714), which can increase an amount of crimping by decreasing the distance between crimps and lower the down pressure on the crop. In FIG. 9B, the UI 902*b* illustrates a sliding scale 908 that show a user when crimping pressure is too high 910 or too low 912, which may be indicative of undesired results. For example, the system can identify, as described above, when the crimp quality is within the desired target threshold (e.g., plant termination), or outside of the threshold (e.g., to high 910 to cut the crop, or too low 912 crop is not terminated). In this way, the operator can monitor conditions on the fly to determine if the operation is appropriate.

Figure 10:
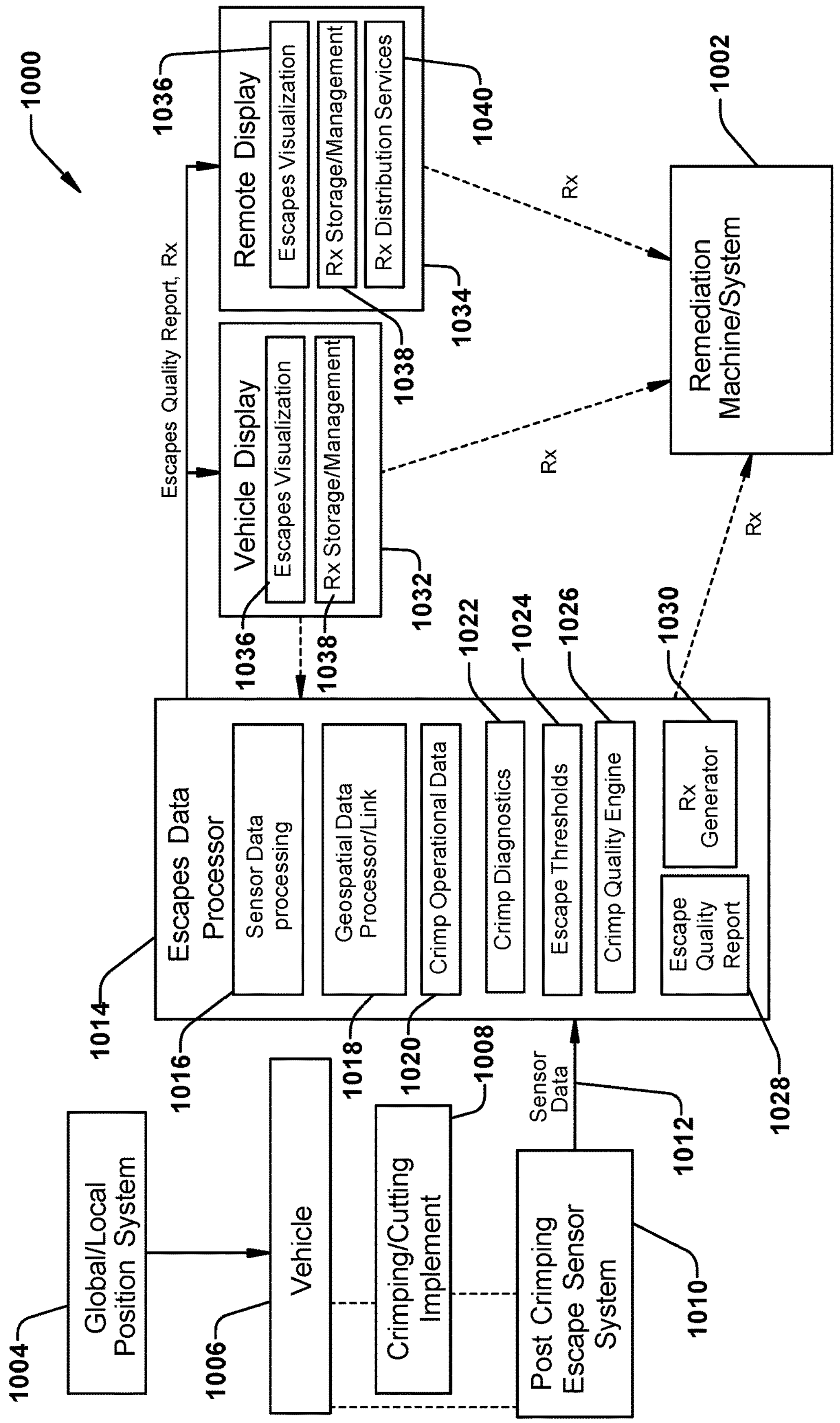
FIG. 10 is a flow diagram illustrating one example implementation of a method for developing a remediation system, as described herein.

FIG. 10 is a schematic diagram of an example implementation of a processing operation 1000 for developing a remediation system for non-terminated crops. That is, for example, during a crimping operation, some of the target crop may not be properly terminated (e.g., escapes that are under or over crimped), which results in regrowth of the cover crop. In this implementation, a remediation system 1002 can be developed to appropriately provide for termination of the escaped crops. A global or local positioning system 1004 (e.g., 604) is used in conjunction with the vehicle 1006 and crimping implement 1008. In this way, the position of any potential escapes can be identified during the operation. A post crimping escape sensor system 1010 (e.g., image data and processing as described in FIG. 6) can be implemented in conjunction with the GPS 1004 to provide sensor data 1012 indicative of a potential escape and its location.

Further, an escape data processor 1014 can comprise a processor and memory with instructions (as described above) for performing the escape processing. Sensor data can be processed 1016, such as image processing to identify potential crops that are not within the crimping threshold after conditioning with the implement. The geospatial data can be associated with the sensor data 1018 to identify the location of potential escapes. A crimp quality engine 1026 can use the geo-linked sensor data, crimping operation data 1018 (e.g., from system 600), and crimp diagnostics 1022, along with an escape threshold 1024, to generate an escape quality report 1028. That is, for example, the data generated during a crimping operation can be used to identify the location, and potential type (e.g., high to low likelihood of escape, occurrence count, etc.) of escapes, and provide a report of escape location, density, amount, etc.

A remediation generator 1030 can generate control instructions for remediation machine/system 1002 for the identified escapes based on the escape quality report. For example, based on the type, quality, location, density, etc. of the escapes in a particular location, the generator 1030 may suggest alternate remediation operations, such as re-crimping, crop spray, etc., along with the location and remediation system for the operation (e.g., type of equipment and settings for the equipment needed to remediate the escapes identified). During the operation, information associated with the escapes quality report 1028 can be provided to an operator in a vehicle display 1032, or to an operations manager in a remote display 1034. As illustrated, the escapes quality report can provide real-time escape visualization 1036, and real-time remediation management solutions 1038 (e.g., or storage of remediation plans in memory) during the operation. Additionally, remediation services 1040 can be provided to illustrate additional, potential remediation operations for a system of fields.

Figure 11:
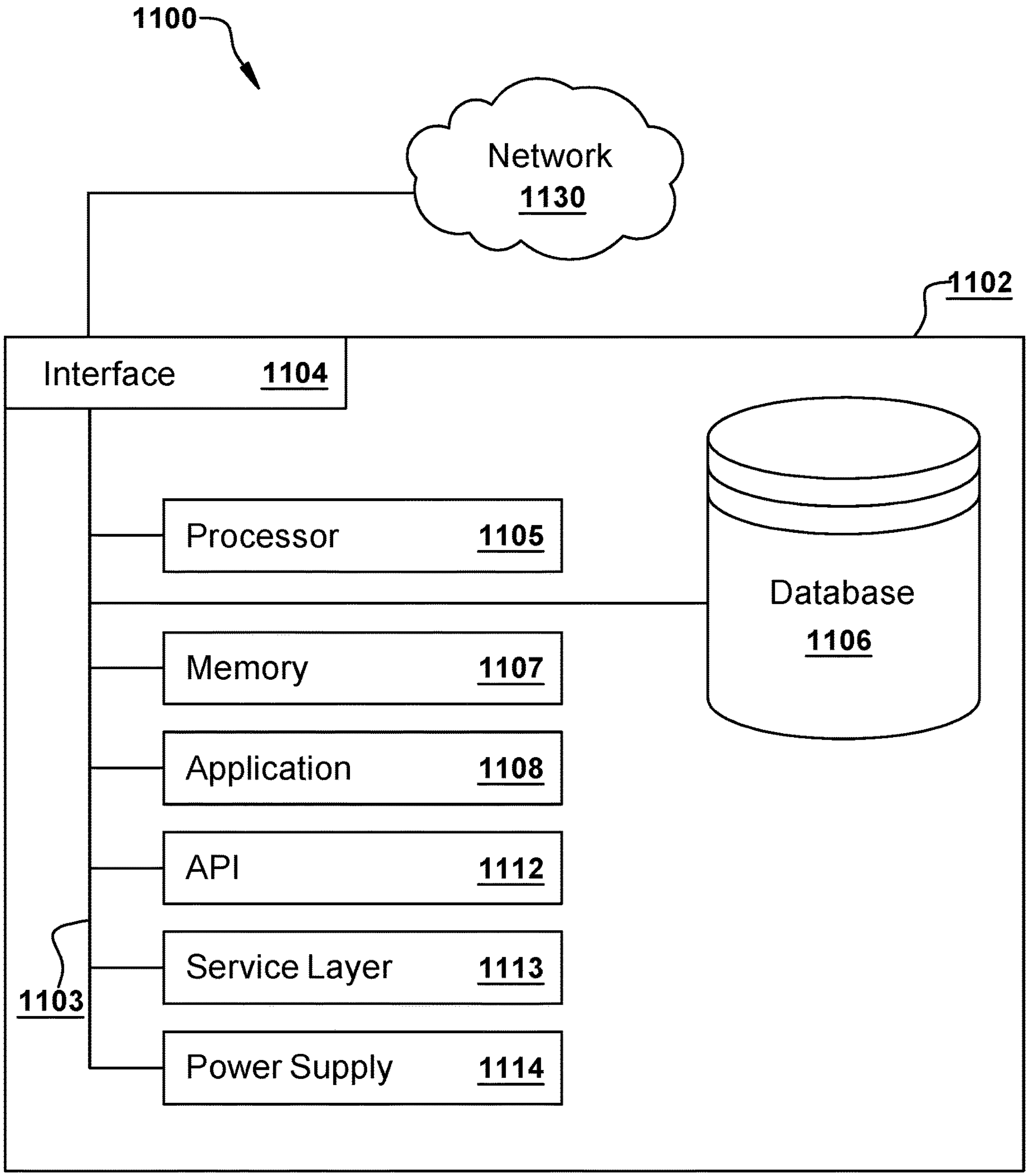
FIG. 11 is a schematic diagram of an example computer system that can be used to provide computational functionalities associated with methods and systems described herein.

FIG. 11 is a schematic diagram of an example computer system 1100 used to provide computational functionalities associated with described algorithms, methods, functions, processes, flows, and procedures described in the present disclosure, according to some implementations of the present disclosure. The illustrated computer 1102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1102 can include input devices such as keypads, keyboards, and touch screens that can accept user information. Also, the computer 1102 can include output devices that can convey information associated with the operation of the computer 1102. The information can include digital data, visual data, audio information, or a combination of information. The information can be presented in a graphical user interface (UI) (or GUI).

The computer 1102 can serve in a role as a client, a network component, a server, a database, a persistency, or components of a computer system for performing the subject matter described in the present disclosure. The illustrated computer 1102 is communicably coupled with a network 1130. In some implementations, one or more components of the computer 1102 can be configured to operate within different environments, including cloud-computing-based environments, local environments, global environments, and combinations of environments.

At a high level, the computer 1102 is an electronic computing device operable to receive, transmit, process, store, and manage data and information associated with the described subject matter. According to some implementations, the computer 1102 can also include, or be communicably coupled with, an application server, an email server, a web server, a caching server, a streaming data server, or a combination of servers.

The computer 1102 can receive requests over network 1130 from a client application (for example, executing on another computer 1102). The computer 1102 can respond to the received requests by processing the received requests using software applications. Requests can also be sent to the computer 1102 from internal users (for example, from a command console), external (or third) parties, automated applications, entities, individuals, systems, and computers.

Each of the components of the computer 1102 can communicate using a system bus 1103. In some implementations, any or all of the components of the computer 1102, including hardware or software components, can interface with each other or the interface 1104 (or a combination of both), over the system bus 1103. Interfaces can use an application programming interface (API) 1112, a service layer 1113, or a combination of the API 1112 and service layer 1113. The API 1112 can include specifications for routines, data structures, and object classes. The API 1112 can be either computer-language independent or dependent. The API 1112 can refer to a complete interface, a single function, or a set of APIs.

The service layer 1113 can provide software services to the computer 1102 and other components (whether illustrated or not) that are communicably coupled to the computer 1102. The functionality of the computer 1102 can be accessible for all service consumers using this service layer. Software services, such as those provided by the service layer 1113, can provide reusable, defined functionalities through a defined interface. For example, the interface can be software written in JAVA, C++, or a language providing data in extensible markup language (XML) format. While illustrated as an integrated component of the computer 1102, in alternative implementations, the API 1112 or the service layer 1113 can be stand-alone components in relation to other components of the computer 1102 and other components communicably coupled to the computer 1102. Moreover, any or all parts of the API 1112 or the service layer 1113 can be implemented as child or sub-modules of another software module, enterprise application, or hardware module without departing from the scope of the present disclosure.

The computer 1102 includes an interface 1104. Although illustrated as a single interface 1104 in FIG. 11, two or more interfaces 1104 can be used according to particular needs, desires, or particular implementations of the computer 1102 and the described functionality. The interface 1104 can be used by the computer 1102 for communicating with other systems that are connected to the network 1130 (whether illustrated or not) in a distributed environment. Generally, the interface 1104 can include, or be implemented using, logic encoded in software or hardware (or a combination of software and hardware) operable to communicate with the network 1130. More specifically, the interface 1104 can include software supporting one or more communication protocols associated with communications. As such, the network 1130 or the interface's hardware can be operable to communicate physical signals within and outside of the illustrated computer 1102.

The computer 1102 includes a processor 1105. Although illustrated as a single processor 1105 in FIG. 11, two or more processors 1105 can be used according to particular needs, desires, or particular implementations of the computer 1102 and the described functionality. Generally, the processor 1105 can execute instructions and can manipulate data to perform the operations of the computer 1102, including operations using algorithms, methods, functions, processes, flows, and procedures as described in the present disclosure.

The computer 1102 also includes a database 1106 that can hold data for the computer 1102 and other components connected to the network 1130 (whether illustrated or not). For example, database 1106 can be an in-memory, conventional, or a database storing data consistent with the present disclosure. In some implementations, database 1106 can be a combination of two or more different database types (for example, hybrid in-memory and conventional databases) according to particular needs, desires, or particular implementations of the computer 1102 and the described functionality. Although illustrated as a single database 1106 in FIG. 11, two or more databases (of the same, different, or combination of types) can be used according to particular needs, desires, or particular implementations of the computer 1102 and the described functionality. While database 1106 is illustrated as an internal component of the computer 1102, in alternative implementations, database 1106 can be external to the computer 1102.

The computer 1102 also includes a memory 1107 that can hold data for the computer 1102 or a combination of components connected to the network 1130 (whether illustrated or not). Memory 1107 can store any data consistent with the present disclosure. In some implementations, memory 1107 can be a combination of two or more different types of memory (for example, a combination of semiconductor and magnetic storage) according to particular needs, desires, or particular implementations of the computer 1102 and the described functionality. Although illustrated as a single memory 1107 in FIG. 11, two or more memories 1107 (of the same, different, or combination of types) can be used according to particular needs, desires, or particular implementations of the computer 1102 and the described functionality. While memory 1107 is illustrated as an internal component of the computer 1102, in alternative implementations, memory 1107 can be external to the computer 1102.

The application 1108 can be an algorithmic software engine providing functionality according to particular needs, desires, or particular implementations of the computer 1102 and the described functionality. For example, application 1108 can serve as one or more components, modules, or applications. Further, although illustrated as a single application 1108, the application 1108 can be implemented as multiple applications 1108 on the computer 1102. In addition, although illustrated as internal to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion and management circuits, including recharging, standby, and power management functionalities. In some implementations, the power-supply 1114 can include a power plug to allow the computer 1102 to be plugged into a wall socket or a power source to, for example, power the computer 1102 or recharge a rechargeable battery.

There can be any number of computers 1102 associated with, or external to, a computer system containing computer 1102, with each computer 1102 communicating over network 1130. Further, the terms "client," "user," and other appropriate terminology can be used interchangeably, as appropriate, without departing from the scope of the present disclosure. Moreover, the present disclosure contemplates that many users can use one computer 1102 and one user can use multiple computers 1102.

Described implementations of the subject matter can include one or more features, alone or in combination.

Additionally, in some implementations, the data can be collected at regular intervals (e.g., or continually) and curated into a remote operations center, and loaded to a database with spatial and temporal indexing capabilities. As one example, the data may be analyzed as it is collected for unload begin and end signals, and then, in combination with the location and time information, and the data records, determine which product transport container (e.g., grain cart or trailer) was positioned at a location at that time given known equipment dimensions and characteristics. In this example, once a match is identified, a "Virtual Load" record may be created or extended for the equipment receiving the load that contains pre-determined load metrics and characteristics, such as weight, volume, load time, condition of the product, and much more. As an example, this collection and curation of the data can be done automatically based on the load signals, location, and time match without need for operator intervention. Further, if the target transport container, such as a cart, already contains one or more portions of another load at the time of collection, the load quality information for all of the contained, partially filled loads can be aggregated together as appropriate for the circumstances.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for automatically adjusting a crop crimping implement, comprising:

a crop crimping implement that crimps a target crop;

a first image sensor that collects image data indicative of a condition of the target crop that is crimped by the crop crimping implement in real-time;

a control module that receives the image data and generates crimp quality data indicative of a quality of a crimp applied to the target crop, the control module comprising:

a computer processor; and memory that stores instructions configured to, when processed by the computer processor:

generate the crimp quality data for the target crop by classifying the image data based at least upon a shape, size, and color of the crimped target crop; and determine adjustment data indicative of an adjustment to the crop crimping implement based at least upon the crimp quality data and a predetermined crimp quality threshold; and one or more actuators that adjust the crop crimping implement based at least upon the adjustment data.

2. The system of claim 1, the one or more actuators adjusting a distance between crimping rollers in a roller assembly of the crop-crimping implement.

3. The system of claim 2, the one or more actuators further configured to adjust one or more of:

a speed of one or more of the crimping rollers in the roller assembly; and a pressure exerted by the rollers on the target crop.

4. The system of claim 1, the one or more actuators further configured to adjust a speed of the crop-crimping implement.

5. The system of claim 1, the first image sensor comprising a camera configured to generate the image data of the target crop after crimping by the roller crop crimping implement.

6. The system of claim 1, the one or more actuators adjusting an amount of downward pressure applied to the target crop.

7. The system of claim 1, the one or more actuators adjusting a shape of a crimping roller in the crop crimping implement.

8. The system of claim 7, the actuators adjusting a shape comprising extending or retracting a crimping edge of the crimping implement.

9. The system of claim 1, comprising a geolocation sensor that provides geolocation data, the control module using the geolocation data to determine a position of an escape, the escape indicative of a portion of the target crop that did not meet the predetermined crimp quality threshold.

10. The system of claim 1, comprising a user interface (UI) that displays one or more of:
- escape quality report;
- escape distribution; and
- a prescription for remediating the escapes.

11. The system of claim 1, comprising a second image sensor that generates image data of a pre-crimped target crop indicative of the target crop prior to crimping, and the control module using the image data of the pre-crimped target crop to generate the crimp quality data and determine the adjustment data.

12. The system of claim 11, the image data of a pre-crimped target crop indicative of one or more of: target crop condition, and target crop type.

13. The system of claim 11, the image data from the first image sensor data compared with the image data of the second image sensor to identify an amount of crimping applied by the crimping implement.

14. The system of claim 1, comprising a user interface (UI) that displays one or more of:
- crimping performance;
- state of crimping implement; and
- changes to the crimping implement.

15. The system of claim 1, the stored instructions further configured to perform a multi-layered image classification of images generated by the image sensor based at least on deep convolutional neural network training of a classifier.

16. A method for using a system that automatically adjusts a crop crimping implement, comprising:
- using a crop crimping implement to crimp a target crop;
- using a first image sensor to collect image data indicative of a condition of the target crop crimped by the crop crimping implement in real-time;
- using a control module to receive the image data and generate crimp quality data indicative of a quality of the crimp applied to the target crop, the control module comprising:
  - a computer processor; and
  - memory that stores instructions that, when processed by the computer processor:
    - generates the crimp quality data for the target crop by classifying the image data based at least upon a shape, size, and color of the crimped target crop; and
    - determines adjustment data indicative of an adjustment to the crop crimping implement based at least upon the crimp quality data and a predetermined crimp quality threshold; and
- using one or more actuators to adjust the crop crimping implement based at least upon the adjustment data.

17. The method of claim 16, using the one or more actuators to adjust the crop crimping implement comprising one or more of:
- adjusting a distance between crimping rollers in a roller assembly of the crop-crimping implement;
- adjusting an amount of downward pressure applied to the target crop; and
- adjusting a shape of a crimping roller in the crop crimping implement.

18. The method of claim 16, comprising using a geolocation sensor to provide geolocation data, wherein the control module uses the geolocation data to determine a position of an escape, wherein the escape is indicative of a portion of the target crop that did not meet the predetermined crimp quality threshold.

19. The method of claim 18, comprising using a user interface (UI) to display one or more of:
- escape quality report;
- escape distribution; and
- a prescription for remediating the escapes.

20. A system for automatically adjusting a crop crimping implement, comprising:
- a crop crimping implement configured to merely crimp a target crop to termination;
- a first image sensor that collects post-crimp image data indicative of a crimp condition of a target crop crimped by the crop crimping implement in real-time;
- a second image sensor that collects pre-crimp image data indicative of a pre-crimp condition of the target crop prior to crop crimping;
- a control module that receives the post-crimp and pre-crimp image data and generates crimp quality data indicative of a quality of the crimp applied to the target crop, the control module comprising:
  - a computer processor; and
  - memory that stores instructions configured to, when processed by the computer processor:
    - generate the crimp quality data for the target crop by classifying the image data based at least upon one or more of shape, size, and color; and
    - determine adjustment data indicative of an adjustment to the crop crimping implement based at least upon the crimp quality data and a predetermined crimp quality threshold, the predetermined crimp quality threshold between a cut crop and a standing crop; and
- one or more actuators that adjust the crop crimping implement based at least upon the adjustment data, the one or more actuators adjusting one or more of a crimping implement shape and an amount of downward pressure applied to the crimping implement.

* * * * *